United States Patent
Tsutsumoto et al.

(10) Patent No.: US 7,343,738 B2
(45) Date of Patent: Mar. 18, 2008

(54) REGENERATION OF DIESEL PARTICULATE FILTER

(75) Inventors: Naoya Tsutsumoto, Yokohama (JP);
Junichi Kawashima, Yokosuka (JP);
Masahiko Nakano, Machida (JP);
Makoto Ootake, Yokohama (JP);
Shouichirou Ueno, Yokohama (JP);
Terunori Kondou, Yokohama (JP);
Toshimasa Koga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 169 days.

(21) Appl. No.: 11/169,639

(22) Filed: Jun. 30, 2005

(65) Prior Publication Data

US 2006/0016177 A1 Jan. 26, 2006

(30) Foreign Application Priority Data

Jul. 23, 2004 (JP) ............................. 2004-215568

(51) Int. Cl.
*F01N 3/00* (2006.01)
*F01N 3/02* (2006.01)

(52) U.S. Cl. .............................. 60/295; 60/297; 60/311

(58) Field of Classification Search .................. 60/297, 60/311, 295

See application file for complete search history.

(56) References Cited

U.S. PATENT DOCUMENTS

| | | | | |
|---|---|---|---|---|
| 5,319,930 A | * | 6/1994 | Shinzawa et al. | 60/286 |
| 5,651,248 A | * | 7/1997 | Kawamura | 60/286 |
| 6,829,890 B2 | * | 12/2004 | Gui et al. | 60/295 |
| 6,851,258 B2 | * | 2/2005 | Kawashima et al. | 60/311 |
| 6,928,809 B2 | * | 8/2005 | Inoue et al. | 60/297 |
| 6,973,778 B2 | * | 12/2005 | Kondou et al. | 60/295 |
| 7,000,384 B2 | * | 2/2006 | Kagenishi | 60/295 |
| 7,093,428 B2 | * | 8/2006 | LaBarge et al. | 60/286 |
| 2005/0198944 A1 | * | 9/2005 | Saitoh et al. | 60/295 |

FOREIGN PATENT DOCUMENTS

EP 1 439 294 A2 7/2004
JP 2002-309922 A 10/2002

* cited by examiner

*Primary Examiner*—Thomas Denion
*Assistant Examiner*—Loren Edwards
(74) *Attorney, Agent, or Firm*—Foley & Lardner LLP

(57) ABSTRACT

An engine controller (20) controls regeneration of a diesel particulate filter (11) deployed along an exhaust passage (3) of a vehicle diesel engine (9). Regeneration terminates in response to a terminating request based on running conditions of the diesel engine (1). When the regeneration elapsed time at the time of termination is shorter than a reference duration, the engine controller (20) adds a time corresponding to a deviation of the regeneration elapsed time from the reference duration to the reference duration for the next regeneration of the DPF (11), thereby completely removing particulate matter accumulated in and around an inlet (18) of the filter (11).

5 Claims, 6 Drawing Sheets

5 CRANK ANGLE SENSOR
7 AIR FLOW METER
14 DIFFERENTIAL PRESSURE SENSOR
15, 16 TEMPERATURE SENSOR

REGENERATION OF DIESEL PARTICULATE FILTER

FIELD OF THE INVENTION

This invention relates to regeneration of a diesel particulate filter.

BACKGROUND OF THE INVENTION

The diesel particulate filter (hereinafter referred to as DPF), which traps particulate matter included in exhaust gas discharged from a diesel engine, is characterized in that the greater the accumulated amount of particulate matter, the greater the exhaust flow resistance, resulting in an increased differential pressure between upstream and downstream of the DPF.

To eliminate the accumulated particulate matter, so-called regeneration of the DPF is carried out. According to such regeneration, it is determined that the accumulated amount of particulate matter has reached a reference trapping amount when the DPF pressure is higher than a predetermined pressure, and the particulate matter accumulated in the DPF is then burned, allowing the DPF to resume successfully trapping particulate matter.

However, the particulate matter is not evenly accumulated in the DPF and tends to be centrally accumulated in and around the inlet of the DPF. The particulate matter accumulated in this area tends not to be easily burned as opposed to that accumulated further downstream the DPF. This emanates from the fact that combustion heat generated in the upstream region of the DPF is available for burning the particulate matter accumulated in the DPF, while on the other hand, only the heat of the exhaust gas can be used to burn particulate matter in and around the inlet.

SUMMARY OF THE INVENTION

JP2002-309922-A published by Japan Patent Office in 2002 proposes formation of bumps around the inlet of the DPF pointing upstream, making particulate matter difficult to adhere near the inlet.

According to this prior art, it is possible to prevent accumulation of particulate matter near the inlet of the DPF. However, since the prior art does not have any specific arrangement for removal of the particulate matter accumulated in and around the inlet of the DPF, removal of the particulate matter accumulated in this area is never assured. In other words, even though accumulation of particulate matter in this area is suppressed, repetitive regeneration of the DPF and repetitive suspension of regeneration of the DPF tend to increase the amount of particulate matter accumulated in this area according also to the prior art.

It is therefore an object of this invention to completely remove particulate matter accumulated in and around the inlet of the DPF when regenerating.

In order to achieve the above object, this invention provides an apparatus for regenerating a diesel particulate filter by burning particulate matter accumulated in the diesel particulate filter, which is deployed along an exhaust passage of a vehicle diesel engine, The apparatus comprises a sensor that detects a temperature of the filter, and a programmable controller. The controller is programmed to accumulate an elapsed time during which the temperature of the filter is higher than a filter regeneration temperature, calculate a deviation of the elapsed time from a predetermined regeneration duration of time when regeneration of the filter is terminated, and correct a condition for the next regeneration of the filter based on the deviation.

This invention also provides a method for regenerating the diesel particulate filter. The method comprises detecting a temperature of the filter, accumulating an elapsed time during which the temperature of the filter is higher than a filter regeneration temperature, calculating a deviation of the elapsed time from a predetermined regeneration duration of time when regeneration of the filter is terminated, and correcting a condition for the next regeneration of the filter based on the deviation.

The details as well as other features and advantages of this invention are set forth in the remainder of the specification and are shown in the accompanying drawings.

DESCRIPTION OF THE PREFERRED EMBODIMENTS

Figure 1:
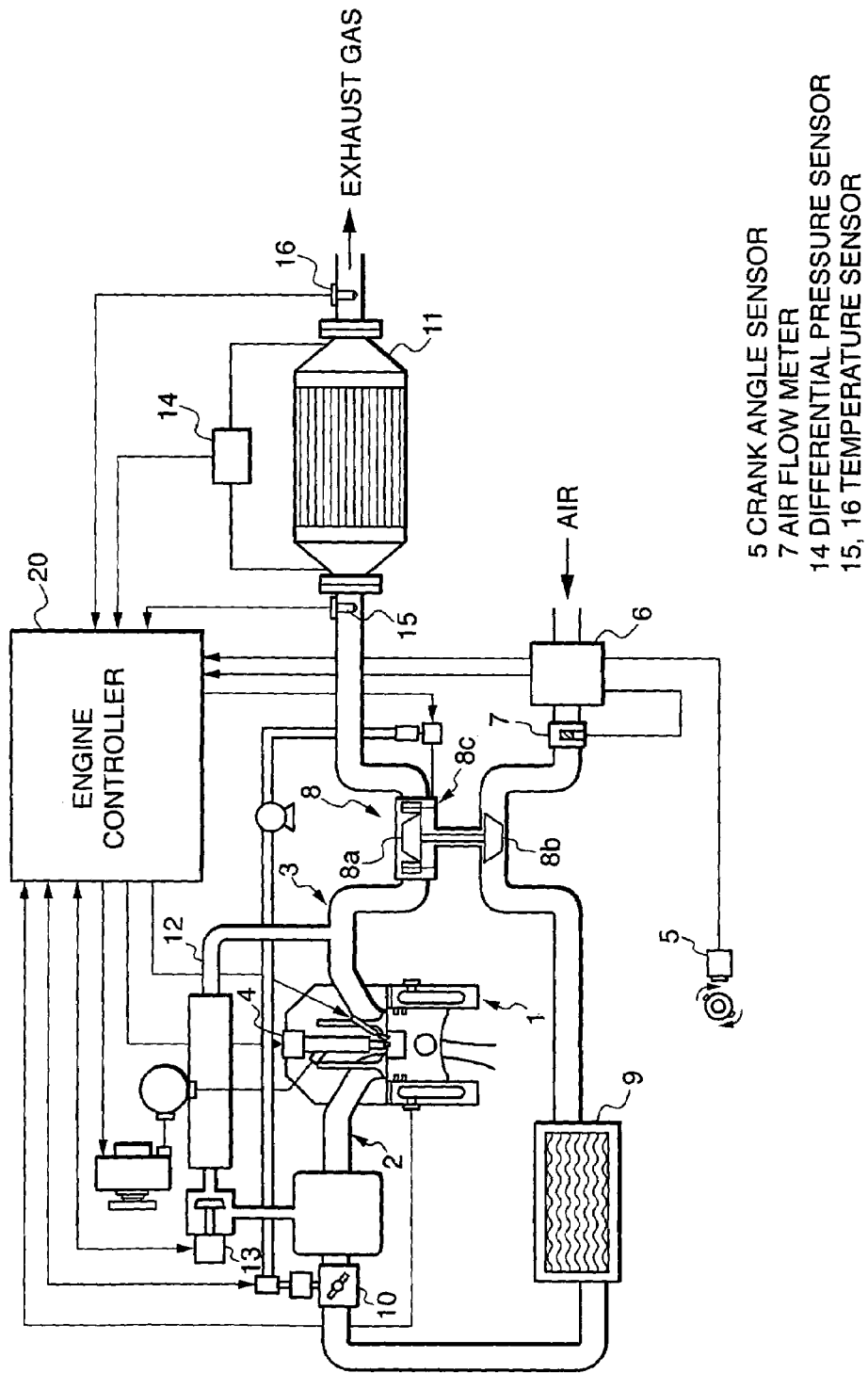
FIG. 1 is a schematic diagram of an exhaust gas purification device of a diesel engine according to this invention.

Referring to FIG. 1 of the drawings, a diesel engine 1 for running a vehicle comprises an intake passage 2 which aspirates air, and an exhaust passage 3 which discharges an exhaust gas. The intake passage 2 and the exhaust passage 3 are connected to multiple combustion chambers of the diesel engine 1.

The diesel engine 1 comprises, in the intake passage 2, an air cleaner 6 which removes dust from the intake air from the outside, a compressor 8b of a turbocharger 8 which supercharges the intake air, an intercooler 9 which cools down the intake air, and an intake throttle 10 which regulates an air intake flow rate.

The diesel engine 1 comprises fuel injectors 4, which are deployed in the upper regions of the respective combustion chambers and inject fuel towards the air aspirated through the intake passage 2.

The diesel engine 1 comprises, in the exhaust passage 3, a turbine 8a of the turbocharger 8 and a DPF 11 which traps particulate matter included in the exhaust gas. The turbine 8a and the compressor 8b of the turbocharger 8 simultaneously rotate around a rotating shaft. The energy of exhaust gas flowing through the exhaust passage 3 causes the compressor 8b to rotate via the turbine 8a, thereby supercharging the intake air of the diesel engine 1. The turbine 8a comprises a so-called variable geometry system, which uses a variable nozzle 8c to narrow cross-sectional flow area of exhaust gas when the engine 1 rotates at a low speed and thereby securing a desired exhaust pressure.

The variable nozzle 8c and the intake throttle 10 are driven via respective diaphragm actuators which operate in response to negative pressures.

The exhaust passage 3 and the intake passage 2 link to each other via an exhaust gas recirculation (EGR) pipe 12. Part of the exhaust gas from the exhaust passage 3 flows back into the intake passage 2 via the EGR pipe 12. An EGR valve 13 which regulates the EGR flow rate is installed in the EGR pipe 12.

Fuel injection amount and injection timing of the fuel injectors 4, degree of opening of the EGR valve 13, supply of negative pressure to diaphragm actuators, which drive the variable nozzle 8c and the intake throttle 10, are respectively controlled in conformity with output signals from an engine controller 20.

The engine controller 20 constituted by a microcomputer comprising a central processing unit (CPU), read-only memory (ROM), random access memory (RAM), and an input/output interface (I/O interface). The controller may also be constituted by multiple microcomputers.

To control the above parameters, a variety of sensors are deployed, and detected data therefrom enters the engine controller 20 via a signal circuit.

These sensors include but not limited to a crank angle sensor 5 which detects a crank angle of the diesel engine 1, an air flow meter 7 which detects an intake air flow rate in the intake passage 2, a differential pressure sensor 14 which detects a differential pressure between upstream and downstream of the DPF 11, a temperature sensor 15 which detects an exhaust gas temperature in a upstream region of the DPF 11, and a temperature sensor 16 which detects an exhaust gas temperature in a downstream region of the DPF 11.

Figure 2A:
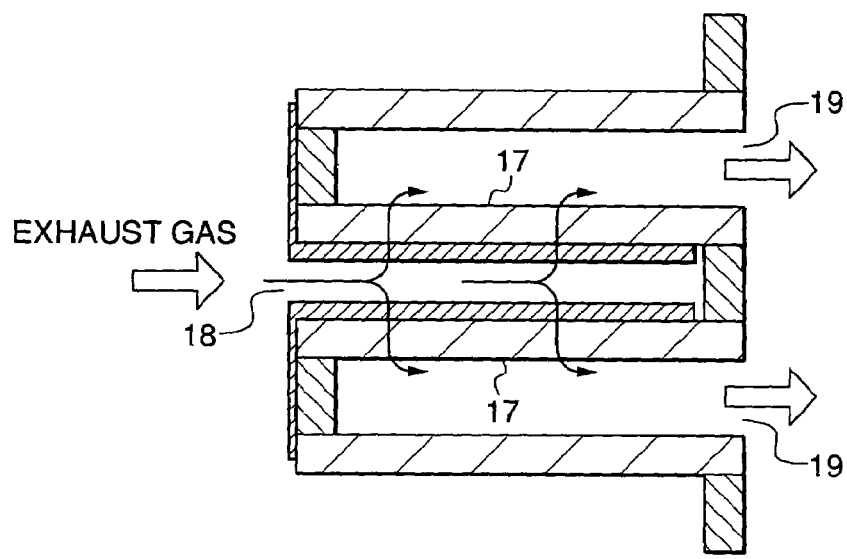
FIGS. 2A and 2B are schematic cross sectional views of a DPF for describing a behavior of particulate matter in the DPF.
Figure 2B:
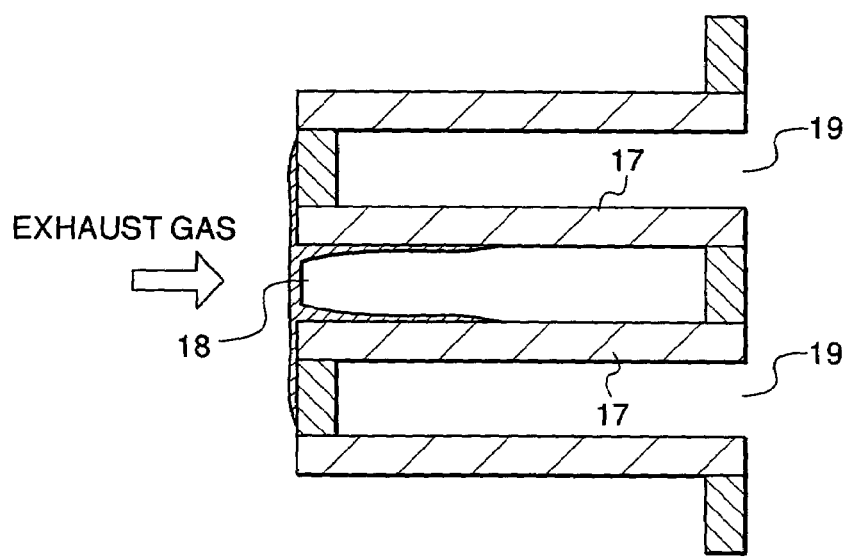

Next, referring to FIGS. 2A and 2B, a behavior of particulate matter in the DPF 11 is described.

Referring to FIG. 2A, the DPF 11 comprises a filter 17 which supports a catalyst, an inlet 18 which introduces the exhaust gas from the diesel engine 1 to the filter 17, and an outlet 19 which discharges exhaust gas that has passed through the filter 17.

In the drawing, some particulate matter is accumulated in and around the inlet 18 of the DPF 11. This amount is not much greater than those accumulated in other portions. In such a state, the exhaust gas having flown into the DPF 11 passes through the filter 17, which then traps particulate matter included in the exhaust gas. The exhaust gas is discharged from the outlet 19 after the particulate matter has been trapped by the filter 17.

FIG. 2B shows that particulate matter has accumulated on the upstream end surface of the DPF 11. In the following description, this particular portion is referred to as a front end. Accumulation of particulate matter on the front end face may result in complete blockage of the inlet 18. Such complete blockage of the inlet 18 prevents discharge of exhaust gas even if a large amount of particulate matter has not accumulated in the filter 17, causing the operation of the diesel engine 1 to halt. Such blockage of the inlet 18 develops due to the following reason.

In general, accumulation of particulate matter in the filter 17 leads to increase in the exhaust flow resistance of the DPF 11 and increase in differential pressure, which is detected by the differential pressure sensor 14. The engine controller 20 regenerates the DPF 11 when it has determined based on the detected differential pressure that particulate matter accumulated in the DPF 11 has reached a reference trapping amount.

Regeneration of the DPF 11 is performed by applying the following known method.

Specifically, the particulate matter accumulated in the DPF 11 is burned by raising the temperature of the exhaust gas through processing, such as narrowing the intake throttle 10 and thereby increasing a pumping loss of air supplied to the diesel engine 1, controlling the fuel injector 4 to inject an increased amount of fuel, or performing a post-injection after the fuel injector 4 has conducted a primary injection.

Figure 3:
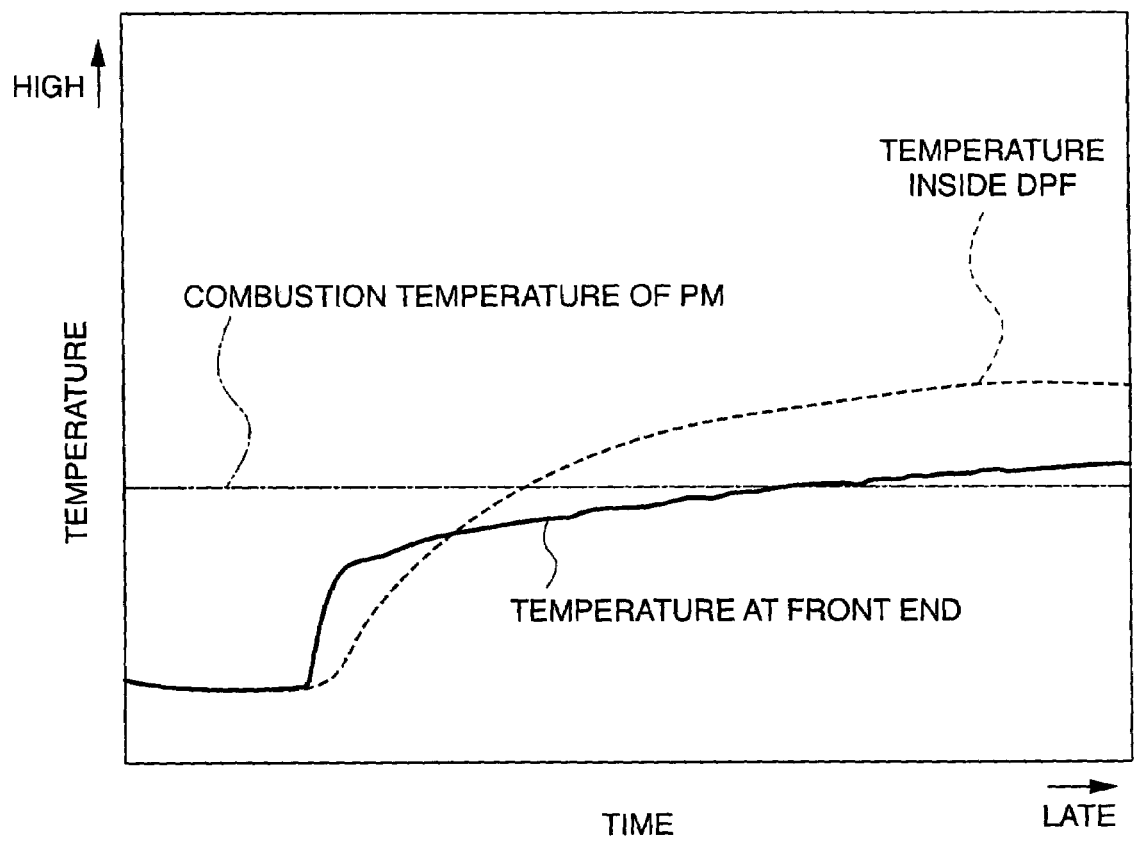
FIG. 3 is a timing chart showing changes in temperature at respective DPF portions when regenerating the DPF according to this invention.

Next, referring to FIG. 3, changes in temperature of the DPF 11 during regeneration thereof are described. A solid line in the figure represents a temperature at the front end of the DPF 11 while a broken line represents an inner temperature of the DPF 11.

Once regeneration of the DPF 11 starts, a high temperature exhaust gas flows into the DPF 11, resulting in an increased temperature at the front end. Afterwards, once particulate matter accumulated in the DPF 11 starts to burn, the inner temperature of the DPF 11 increases.

Since the exhaust gas flows downstream through the DPF 11, temperature at the front end of the DPF 11 rises slower than inside thereof after particulate matter has started to burn, and the particulate matter accumulated on the front end burns slower than that accumulated inside the DPF 11.

Consequently, when regeneration of the DPF does not continue for a sufficient period of time due to, for example, changes in operating conditions of the diesel engine 1, unburned particulate matter remains mainly on the front end. Repeating such incomplete regeneration of the DPF 11 may lead to gradual increase in particulate matter on the front end, and may ultimately result in blockage of the inlet 18 as shown in FIG. 2B.

Increase in the amount of particulate matter accumulated in the inlet 18 leads to an increased differential pressure, which is detected by the differential sensor 14, even though particulate matter has not accumulated inside the DPF 11. At this time, if the engine controller 20 misunderstands based on an increase in differential pressure that the amount of particulate matter accumulated in the DPF 11 has reached a reference trapping amount and accordingly regenerates the DPF 11, frequency of regenerating the DPF 11 increases, allowing the diesel engine 1 to needlessly increase the amount of fuel consumption.

This invention aims to completely remove particulate matter accumulated on the front end of the DPF 11 without increasing frequency of regenerating the DPF by determining a state of particulate matter accumulated on the front end and then correcting a duration of DPF regeneration time when carrying out the next regeneration of the DPF so that particulate matter is not unevenly distributed.

Figure 4:
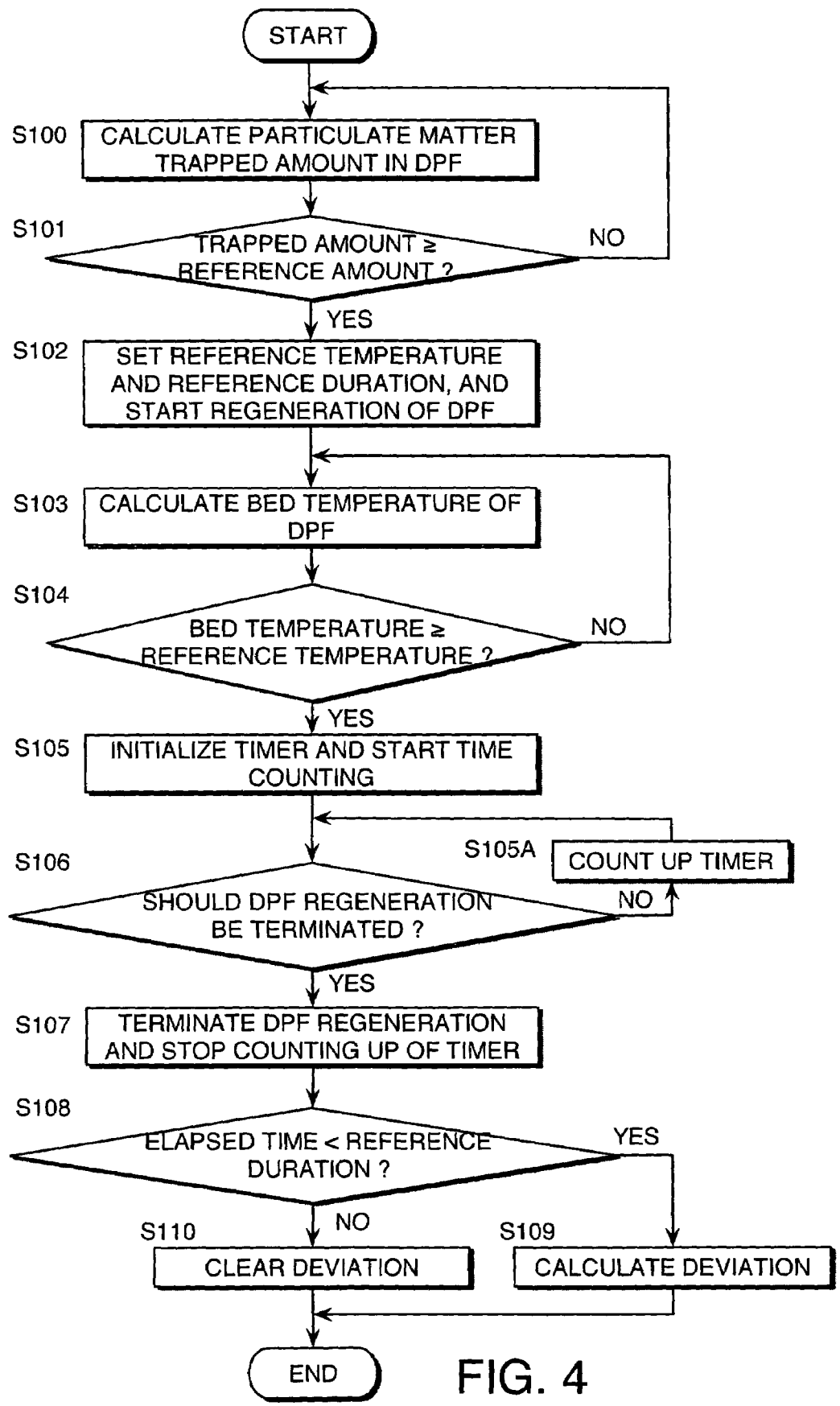
FIG. 4 is a flowchart describing a DPF regenerating routine executed by a controller according to this invention.

Next, referring to FIG. 4, a DPF regenerating routine executed by the engine controller 20 for such an operation is described. The engine controller 20 starts to execute this routine at the same time that the diesel engine 1 starts to operate. Upon completion of the routine, the next routine execution begins. As a result, this routine always runs while the diesel engine 1 is operating.

The engine controller 20 executes, in addition to this routine, a separate routine that is specifically provided for determining whether or not operating conditions of the diesel engine 1 are suitable for regeneration of the DPF 11. When the operating conditions of the diesel engine 1 are determined as unsuitable for regeneration of the DPF 11, the separate routine issues a DPF regeneration termination instruction to halt the DPF regenerating routine.

When the operating conditions of the diesel engine 1 are restored to those suitable for regeneration of the DPF 11 while halting execution of the DPF regenerating routine, the engine controller 20 resumes execution of the DPF regenerating routine.

Figure 5:
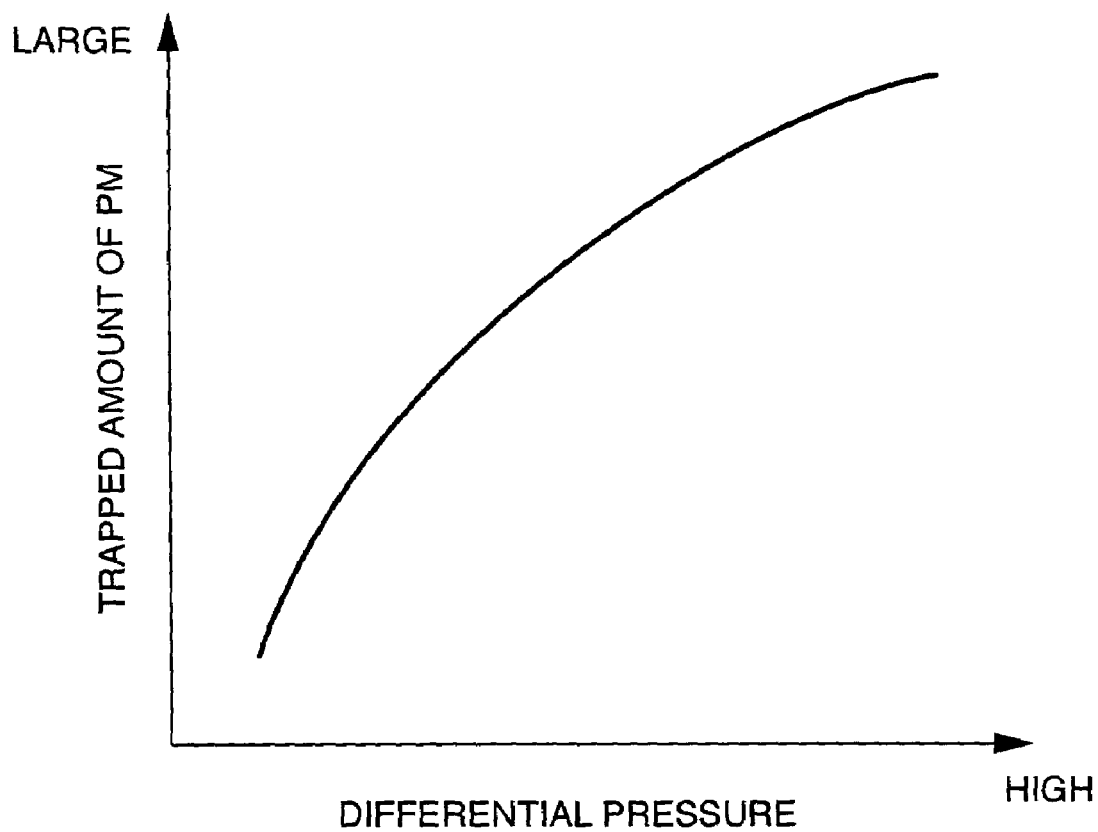
FIG. 5 is a diagram showing a characteristic of a map stored by the controller defining a relation between an accumulated amount of particulate matter and a differential pressure.

In a step S100, the engine controller 20 retrieves a map, which is pre-stored in memory (ROM) and having a characteristic shown in FIG. 5, based on a differential pressure detected by the differential sensor 14, and then calculates a particulate matter trapped amount in the DPF 11.

As shown in FIG. 5, the higher the differential pressure in the map, the greater the particulate matter trapped amount. The map is designed under the assumption that particulate matter is relatively evenly distributed and accumulated in the DPF 11 as shown in FIG. 2A.

In a next step S101, the engine controller 20 compares the particulate matter trapped amount with a predetermined reference trapping amount. The reference trapping amount is a value for determination of whether or not regeneration of the DPF 11 should be carried out, and is not a physical upper limit for the particulate matter trapped amount in the DPF 11. In general, a much lower value than the physical upper limit for the particulate matter trapped amount in the DPF 11 is set as the reference trapping amount.

In the step S101, if the particulate matter trapped amount has reached the reference trapping amount, the engine controller 20 then carries out processing of a step S102. Otherwise, if the particulate matter trapped amount has not yet reached the reference trapping amount, the engine controller 20 then repeats processing of the steps S100 and S101 until the particulate trapped amount reaches the reference trapping amount.

In the step S102, the engine controller 20 sets a reference temperature and a reference duration for regeneration of the DPF 11 in response to vehicle running conditions. Reference temperature and reference duration have the following meanings. Namely, they are values that allow particulate matter trapped by the DPF 11 to burn and particulate matter accumulated on the front end to burn through DPF regeneration at a temperature equal to or greater than the reference temperature over a period equal to the reference duration.

The reference temperature is a temperature necessary for burning particulate matter. It is a relatively low temperature such as 600 degrees Centigrade for a case where the vehicle is running in an urban district at a low speed and therefore raising an exhaust gas temperature is difficult. Otherwise, in a case where it is easy to raise the exhaust gas temperature such as when running at a high speed, a temperature such as 650 degrees Centigrade, which is higher than when running in an urban district is set as the reference temperature.

The reference duration is set according to the reference temperature. Accordingly, it is set to be longer for a low vehicle running speed whereas it is set to be shorter for a high vehicle running speed. Therefore, a map specifying a reference duration according to reference temperature and vehicle running speed is pre-stored in memory (ROM) of the engine controller 20.

The engine controller 20 adds a deviation stored in the memory (RAM) to the reference duration, extending the execution time for DPF regeneration. The deviation is a value calculated in steps S109 or S110, which is described later, through the previous execution of the DPF regenerating routine. The extended reference duration is hereafter called corrected regeneration duration.

When operating conditions for the DPF regenerating routine previously executed differs from those for presently executed DPF regenerating routine, further correction of the corrected regeneration duration according to the present operating conditions is also preferable.

Once the reference temperature and the corrected reference duration are set, the engine controller 20 uses one of the aforementioned, well-known regeneration methods for the DPF 11 to start regenerating the DPF 11.

In a step S103, the engine controller 20 calculates the bed temperature of the DPF 11 from an upstream temperature of the DPF 11 detected by the temperature sensor 15 and a downstream temperature of the DPF 11 detected by the temperature sensor 16. The bed temperature may be an average of the upstream and the downstream temperatures.

For calculation of the bed temperature of the DPF 11, it is also preferable to correct the upstream and the downstream temperatures according to a time constant for a response delay in the temperature variations. Alternatively, the temperature of the DPF 11 may be calculated based on the upstream temperature.

In a step S104, the engine controller 20 determines whether or not the bed temperature is equal to or greater than the reference temperature. If the bed temperature is equal to or greater than the reference temperature, the engine controller 20 carries out processing of a step S105. Otherwise, if not, the engine controller 20 repeats the processing of the steps S103 and S104. Regeneration of the DPF 11 is therefore not performed until the bed temperature reaches the reference temperature.

In the step S105, the engine controller 20 initializes a timer which counts up a time that has elapsed since the bed temperature has reached the reference temperature or since DPF regeneration has started. The counted time represents a duration for regenerating the DPF 11. The timer may utilize a clock function of the microcomputer which constitutes the engine controller 20.

In a step S106, the engine controller 20 determines whether or not to terminate DPF regeneration. DPF regeneration terminating conditions are satisfied when the corrected reference duration has elapsed, or when DPF regeneration is no longer possible due to change in the running conditions of the diesel engine 1 including a change to an engine idle state or to running under a small load.

In the latter case, the aforementioned separate routine issues a DPF regeneration terminating instruction. If either of these terminating conditions is satisfied, the engine controller 20 decides to terminate DPF regeneration. The engine controller 20 repeats counting up of the timer in a step S105A and the determination of the step S106 until either of the DPF regeneration terminating conditions is satisfied.

In the step S106, if it is determined to terminate DPF regeneration, the engine controller 20 carries out processing of a step S107.

In the step S107, the engine controller 20 terminates DPF regeneration that started in the step S102. At the same time, counting up of the timer from the start of DPF regeneration that started in the step 105 is terminated.

In a next step S108, the engine controller 20 determines whether or not the elapsed time from the start of DPF regeneration has reached the corrected reference duration. This operation substantially determines whether DPF regeneration is terminated due to the corrected reference duration having elapsed or due to a terminating instruction issued from the separate routine.

If the determination results indicate that the elapsed time has not yet reached the corrected reference duration, the engine controller 20 carries out processing of a step S109.

In the step S109, the engine controller 20 calculates a deviation of the corrected reference duration from the elapsed time and stores the result in memory (RAM). The deviation stored in the memory is added to the reference duration when executing the next DPF regeneration in the step S102. After the processing of the step S109, the engine controller 20 terminates the routine.

In the step S108, if the determination results indicate that the elapsed time has reached the corrected reference duration, the engine controller 20 resets the deviation to zero in a step S110 and then terminates the routine. In this case, in the step S102 during the next execution of the DPF regenerating routine, the execution duration for DPF regeneration is not extended, and the corrected regeneration duration is set to be equal to the reference duration provided from the map in the step S102.

If the results of executing the routine indicate that the termination of DPF regeneration emanates from the corrected reference duration having elapsed, it can be assumed that the particulate matter accumulated in the DPF 11 including the front end of the DPF 11 has completely burned. Otherwise, if the termination of DPF regeneration emanates from a terminating instruction issued by the separate routine, the elapsed time for DPF regeneration has not yet reached the corrected reference duration, and there is a high possibility that particulate matter remains on the front end of the DPF 11 where particulate matter does not burn easily.

In such a case, deviation of the corrected reference duration from the accumulated time for DPF regeneration is stored in memory, and a duration corresponding to the deviation is then added to the reference duration when executing the next DPF regenerating routine, providing the resulting execution duration for DPF regeneration. Consequently, the particulate matter accumulated in the DPF 11 including the front end thereof is completely removed when executing the next DPF regenerating routine.

Figure 6:
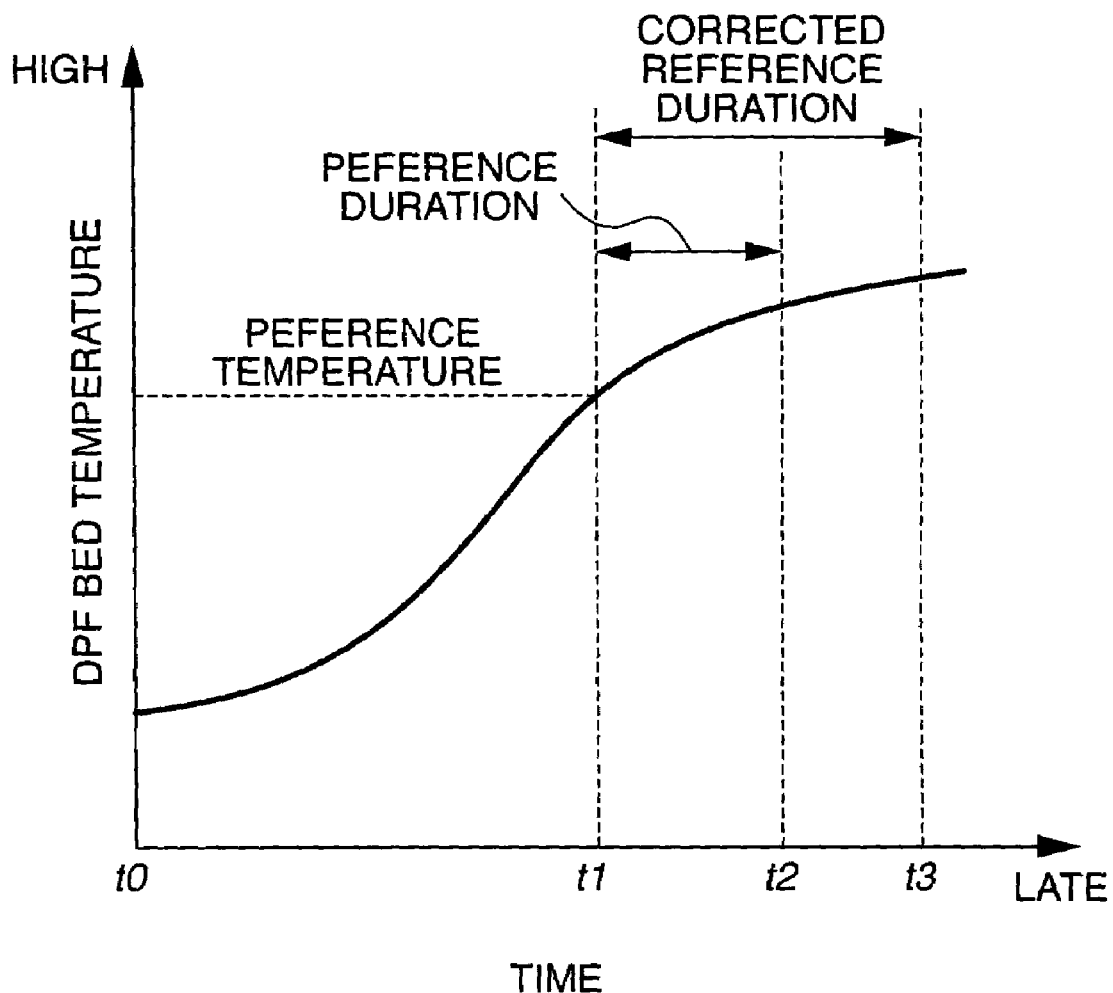
FIG. 6 is a timing chart showing changes in bed temperature of the DPF as a result of the execution of the DPF regenerating routine.

Referring to FIG. 6, a case of the termination of DPF regeneration having emanated from a terminating instruction is described in further detail.

Execution of the DPF regenerating routine starts at a time t0. If the determination result of the step S101 turns to be positive, regeneration of the DPF 11 starts in the step S102, and at the same time the corrected reference duration is calculated using the deviation from the previously executed routine. When the regeneration causes the DPF bed temperature to exceed the reference temperature at a time t1, regeneration of the DPF 11 substantially begins.

A time t3 provided by adding to the time t1 the corrected reference duration calculated in the step S102 becomes a target duration for completely regenerating the DPF 11.

Here, it is assumed that a routine issues a terminating instruction at the time t2 before the time t3. The engine controller 20 terminates regeneration of the DPF 11 in the step S107. At this time, since the accumulated time from the start of regeneration of the DPF 11 at the time t1 has not yet reached the corrected reference duration the determination result of the step S108 is positive, and the engine controller 20 stores a deviation of the corrected reference duration from the accumulated time (t3−t2) in the memory (RAM) in the step S109. Consequently, the corrected reference duration to be calculated when executing the next DPF 11 regenerating routine is equal to a value resulting from adding the deviation (t3−t2) to the reference duration.

Terminating the present execution of the DPF regenerating routine at an early stage provides an extended reference duration for executing the DPF 11 regenerating routine, thereby completely burning particulate matter remaining on the front end. Even though regeneration of the DPF 11 is interrupted in this manner, extending a duration for executing the next DPF 11 regeneration surely prevents accumulation of particulate matter on the front end including the inlet 18.

According to the embodiment described above, a deviation of the corrected reference duration from the accumulated time for continuous regeneration of the DPF 11 is used to calculate a corrected reference duration for the next execution of the routine. However, in a case of regenerating the DPF when a vehicle is running at a high speed, or in a case of conditions allowing rise in an exhaust temperature, it is possible to provide the same results by using as the reference temperature a corrected reference temperature resulting from adding a value corresponding to the deviation to the reference temperature.

More specifically, in the step S102 of FIG. 4, other than correcting the reference duration to a corrected regeneration duration, a value corresponding to the deviation is added to the reference temperature, thereby correcting the reference temperature to a higher corrected reference temperature.

In other words, according to the present invention, a particulate matter regeneration enhancement is not limited to extending a regeneration duration and arbitrary method that can enhance the regeneration of DPF 11 including extending a regeneration temperature may be applicable.

The contents of Tokugan 2004-215568, with a filing date of Jul. 23, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in each of the above embodiments, the parameters required for control are detected using sensors, but this invention can be applied to any DPF regeneration device which can perform the claimed control using the claimed parameters regardless of how the parameters are acquired.

The embodiments of this invention in which an exclusive property or privilege is claimed are defined as follows:

What is claimed is:

1. An apparatus for regenerating a diesel particulate filter by burning particulate matter accumulated in the diesel particulate filter, which is deployed along an exhaust passage of a vehicle diesel engine; the apparatus comprising:

a sensor that detects a temperature of the filter; and
a programmable controller programmed to:
  determine a reference temperature for regeneration temperature of the filter and a reference duration for regeneration duration of the filter based on a vehicle running condition;
  perform the regeneration of the filter by keeping the temperature of the filter not less than the reference temperature over the reference duration;
  accumulate an elapsed time during which the temperature of the filter is higher than a filter regeneration temperature;
  when regeneration of the filter is terminated, calculate a deviation of the elapsed time from a predetermined regeneration duration of time; and
  correct a condition for the next regeneration of the filter based on the deviation.

2. The apparatus as defined in claim 1, further comprising a sensor that detects a vehicle running speed as the vehicle running condition.

3. The apparatus as defined in claim 1, wherein the controller is further programmed to extend the reference duration for the next regeneration of the filter by a time corresponding to the deviation.

4. The apparatus as defined in claim 1, wherein the controller is further programmed to raise the reference temperature for the next regeneration of the filter by a temperature corresponding to the deviation.

5. A method for regenerating a diesel particulate filter by burning particulate matter accumulated in the diesel particulate filter, which is deployed along an exhaust passage of a vehicle diesel engine; the method comprising:

detecting a temperature of the filter;

determining a reference temperature for regeneration temperature of the filter and a reference duration for regeneration duration of the filter based on a vehicle running condition;

performing the regeneration of the filter by keeping the temperature of the filter not less than the reference temperature over the reference duration;

accumulating an elapsed time during which the temperature of the filter is higher than a filter regeneration temperature;

when regeneration of the filter is terminated, calculating a deviation of the elapsed time from a predetermined regeneration duration of time; and correcting a condition for the next regeneration of the filter based on the deviation.

* * * * *